United States Patent [19]

Calderon, Jr. et al.

[11] 4,182,643
[45] Jan. 8, 1980

[54] METHOD OF FORMING GAPS IN MAGNETIC HEADS

[75] Inventors: Arthur Calderon, Jr., Minnetonka; Douglas J. Hennenfent, Minneapolis; Allan L. Holmstrand, Bloomington, all of Minn.

[73] Assignee: Control Data Corporation, Minneapolis, Minn.

[21] Appl. No.: 904,053

[22] Filed: May 8, 1978

Related U.S. Application Data

[63] Continuation-in-part of Ser. No. 813,017, Jul. 5, 1977, abandoned.

[51] Int. Cl.$^2$ .............................................. C25D 1/00
[52] U.S. Cl. ...................................... 156/151; 29/603; 65/43; 156/295; 156/309; 156/325; 360/119; 360/120; 360/121; 427/127; 428/432; 428/539; 428/900
[58] Field of Search ............... 156/309, 295, 151, 319, 156/182, 325; 427/127; 65/36, 43; 29/603; 428/432, 539, 472, 900; 360/119, 121, 120; 204/192 SP, 192 M

[56] References Cited

U.S. PATENT DOCUMENTS

| 3,333,332 | 8/1967 | Vrolijks et al. ........................ 29/603 |
| 3,395,450 | 8/1968 | Koorneef et al. ....................... 29/603 |
| 3,452,430 | 7/1969 | Van Langen et al. .................. 29/603 |
| 3,458,926 | 8/1969 | Maissel et al. ....................... 360/120 |
| 3,605,258 | 9/1971 | Fisher et al. ..................... 204/192 M |
| 3,656,229 | 4/1972 | Sakurai et al. ....................... 428/900 |
| 3,767,497 | 10/1973 | Sommer ................................. 65/36 |
| 3,948,657 | 4/1976 | Yoshikawa et al. ................. 156/295 |
| 4,048,714 | 9/1977 | Huntt ................................. 360/120 |

*Primary Examiner*—John T. Goolkasian
*Assistant Examiner*—J. J. Gallagher
*Attorney, Agent, or Firm*—Robert M. Angus

[57] ABSTRACT

A magnetic head is manufactured by depositing a layer of spacer material onto the facing surfaces of the magnetic cores; the thickness of each layer being approximately one-half the length of the intended gap and the thicknesses of both layers together being approximately equal to the thickness (length) of the gap. A layer of bonding glass is deposited onto the surfaces of the spacer layers and the cores are pressed together at an elevated temperature to fuse the glass layers and extrude most of the glass.

13 Claims, 7 Drawing Figures

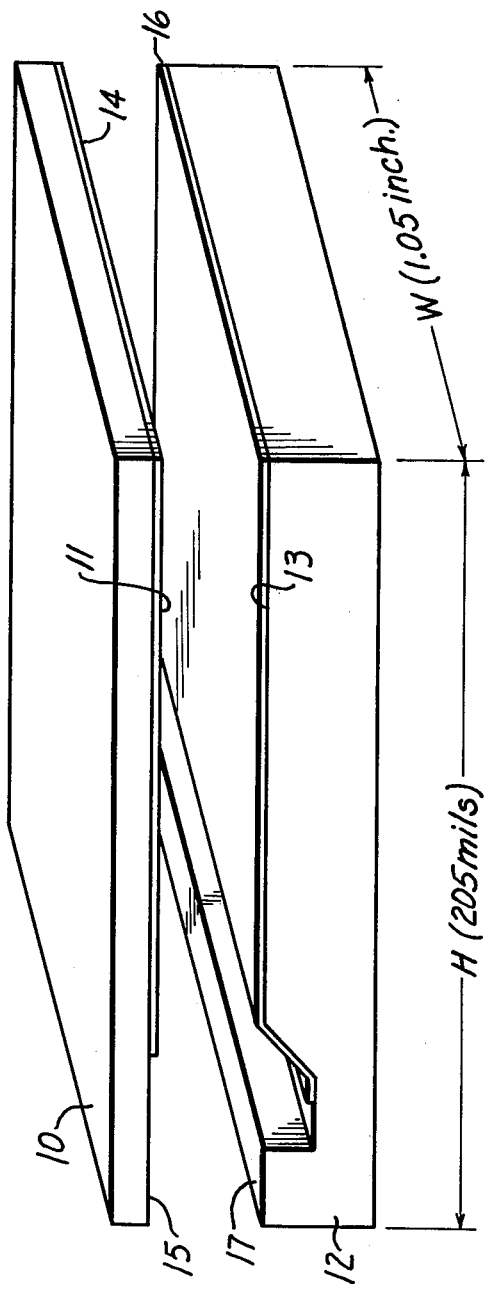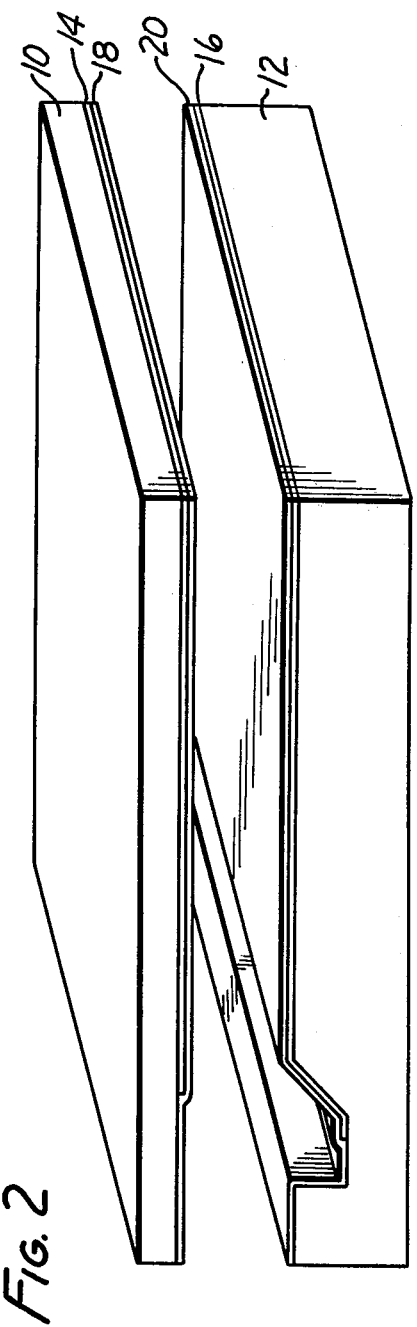

U.S. Patent  Jan. 8, 1980  Sheet 3 of 3  4,182,643
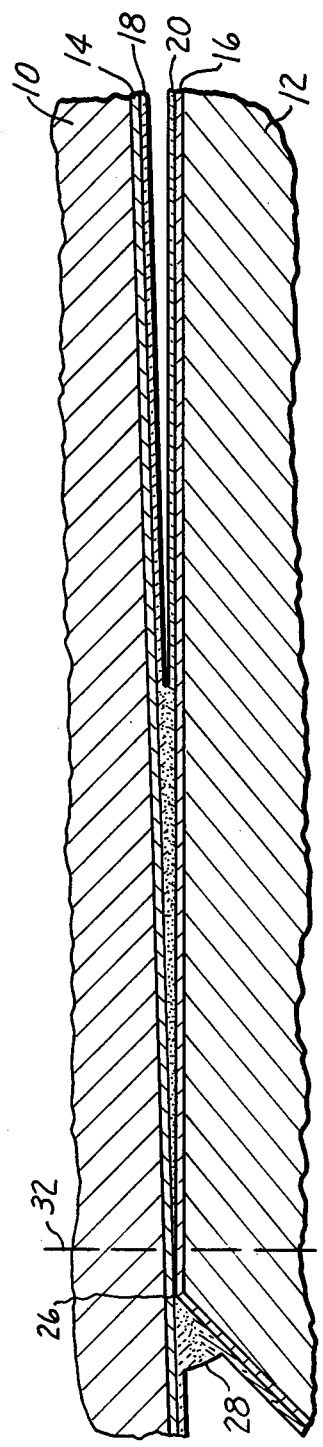
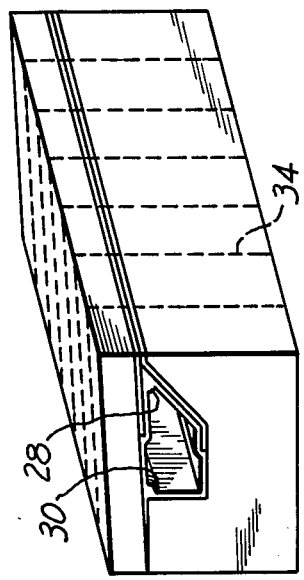
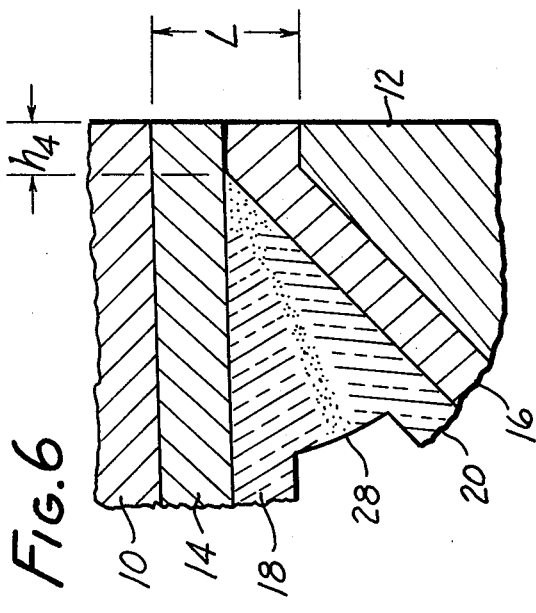

METHOD OF FORMING GAPS IN MAGNETIC HEADS

This application is a continuation-in-part of application Ser. No. 813,017 filed July 5, 1977, now abandoned.

This invention relates to the manufacture of magnetic heads, and particularly to a method of forming gaps in magnetic heads.

In the data recording and reproduction art, the density of the data recorded on a recording media is in part dictated by the gap length of the magnetic recording head. Also, the same is true for data reproduction from recording media; viz the ability to accurately reproduce densely recorded data depends in part on the gap length of the magnetic playback head. As the data recording and recovery art advances toward more densely recorded data, a corresponding need has developed for magnetic heads with smaller gap lengths.

The gap length of a magnetic head is dependent upon the size of a non-magnetic space between opposite circuit parts of a magnetic circuit (usually formed by opposite sections of magnetic ferrite or magnetic non-ferrite thin film). One early technique for the manufacture of non-magnetic gaps in magnetic heads involved positioning the opposite portions of the ferrite cores a fixed distance apart and drawing non-magnetic glass into the space by capillary action to form the gap. Examples of this technique can be found in U.S. Pat. Nos., 3,246,383 (to Peloschek et al); 3,751,803 (to Fisher et al) and 3,824,685 (to Burch et al).

As the state of miniaturization of magnetic heads advanced, problems developed concerning molecular migration between the glass and ferrite. It was discovered, for examle, that a mutual diffusion of glass and ferrite occurred at the interface of the glass-ferrite bond. This diffusion caused deteriorations in the surface layer of the ferrite, causing distortion in the shape of the gap between the ferrite cores and a lowering of permeability and maximum magnetic flux of the ferrite. Also different thermal expansion characteristics between the ferrite and certain glass formulations created residual strain and distortion in the ferrite structure upon cooling. To overcome this problem, Kobayashi et al suggested, in U.S. Pat. No. 3,954,434, a special glass formulation which included a homogeneous dispersion of fine precipitates of ferric oxide ($Fe_2O_3$) and zinc oxide (ZnO) in the bonding glass. While the Kobayashi et al approach alleviated certain of the difficulties with bonding glass, it did not eliminate the problems entirely. (Koorneef, in U.S. Pat. No. 3,851,375, suggested the melting of a shim of non-magnetic metal in the gap, thereby eliminating in glass altogether, but this approach has inherent difficulties in maintaining an accurate gap length.)

Hanak, in U.S. Pat. No. 3,629,519, took advantage of the glass to ferrite molecular migration and suggested using glass as the bonding material for bonding a non-magnetic spacer material to the ferrite. By applying heat and pressure to the core, Hanak was able to achieve a migration of ferrite molecules into the glass so that the reluctance of the glass layer was said to be of the same order of magnitude as the ferrite; but this approach did not completely eliminate the problems. (Hanak also suggested a back gap constructed of glass having ferrite molecules migrated therein by essentially the same process). Mersing, in U.S. Pat. No. 3,508,014, suggested an arrangement wherein a metal coating is bonded to a glass insulator on the ferrite, but Mersing relied on the glass to be part of the gap. Thus, Mersing's approach was subject to the problems associated with ferrite and glass molecular migration.

Riseman, in U.S. Pat. No. 3,886,025 suggested coating the entire ferrite core with a protective layer of silicon nitride and flowing glass between opposite silicon nitride layers (presumably by a capillary process). While this approach seemingly prevented glass-ferrite molecular migration, the glass must be elevated to a temperature such that its viscosity will enable the capillary process to occur. Thus, Riseman's approach did not solve the problems associated with residual strain and distortion, since the wide temperature range that was necessary for the capillary process and the different thermal expansion characteristics between the ferrite, silicon nitride and the glass (particularly the low temperature glasses needed for capillary processes) created residual strain and distortion in the ferrite structure upon cooling.

The present invention is concerned with a method of manufacturing magnetic heads whereby a predetermined layer of spacer material is deposited onto the surface of each confronting magnetic core and a bonding glass is deposited onto the spacer materials. The cores are then pressed together at an elevated temperature to fuse the bonding glass and to extrude essentially all of the glass, thereby leaving the spacer layers contiguous to each other. The spacer material is selected to act as an isolation barrier between any residual glass and the magnetic cores.

One feature of the present invention resides in the fact that by isolating the glass from the ferrite cores the glass need be heated only to the temperature at which the opposing glass surfaces fuse and the excess glass is extruded. Thus, the glass need not be heated to such an extreme as to lower its viscosity, as in capillary processes. Hence, the present invention permits the use of a wider selection of bonding glasses.

As used herein, the term "gap length" refers to the distance between opposite pole pieces of the magnetic core, as would embrace a portion of the length of magnetic media contiguous the head. The term "gap width" refers to the distance along the cores, normal to the gap length, at the surface of the gap, as would embrace a portion of the width of magnetic media contiguous the head to define a data track. The term "gap height" refers to the distance into the gap, from its surface, normal to both the gap length and the gap width.

The above and other features of this invention will be more fully understood from the following detailed description and the accompanying drawings in which:

FIGS. 1–3 are perspective assembly views showing various stages of the method of manufacturing a magnetic head in accordance with the presently preferred embodiment of the present invention;

FIG. 5 is an enlarged section view, as in FIG. 4, showing another stage in the method of manufacturing a magnetic head;

FIG. 6 is an enlarged section view of a completed front gap made in accordance with the present invention; and FIG. 7 is a perspective view of a core manufactured in accordance with the present invention ready for dicing into a plurality of cores available for magnetic heads.

Figure 3:
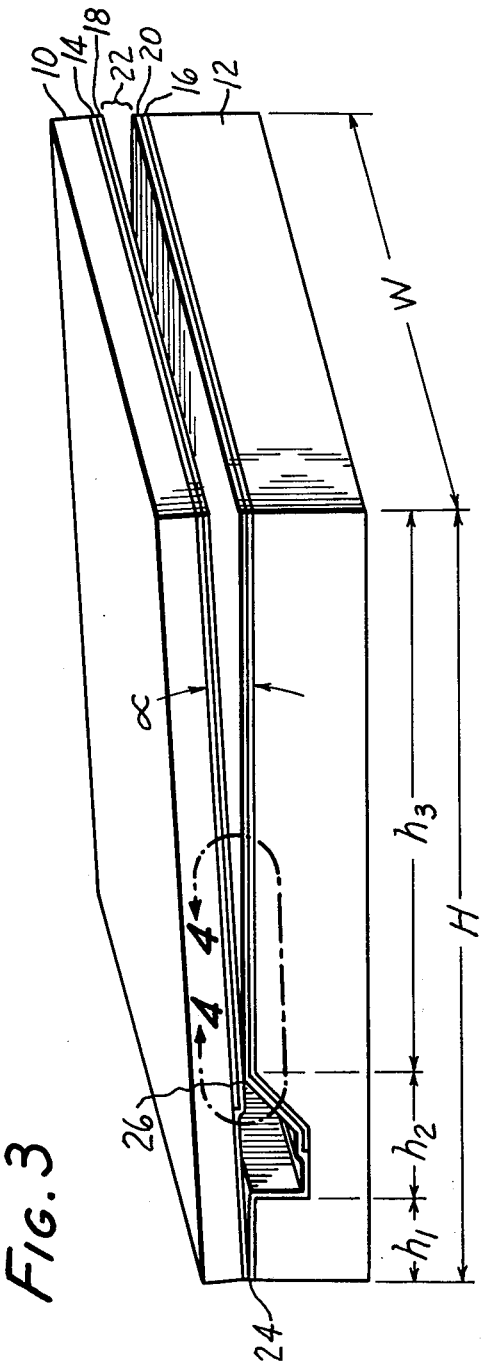

With reference to the drawings, and particularly to FIGS. 1-3, there is illustrated a pair of ferrite members 10 and 12, each having a polished surface 11, 13 which will be the facing surfaces across the front gap of a magnetic head to be constructed. One of the members (for example, member 12) may be a C-core whose surface 13 is defined by one leg of the C. Typically, the height, H, of the members 10 and 12 is of the order of 205 mils and the width, W, of the members is of the order of 1.05 inches. (As used herein, the height, width and length of the members, and of portions of the members will be designated in directions parallel to the height, width and length of the gap to be constructed. Therefore, the height, width and length are not intended to designate relative dimensions.) Typically, the height, $h_1$, of the back gap (prior to a subsequent machining step) is of the order of 20 mils, the height, $h_2$, of the window between the gaps is of the order of 25–55 mils, and the height, $h_3$, of the front gap (prior to a subsequent machining step) is of the order of 130–160 mils.

A thin, uniform passivation layer of gap material 14, 16 is sputter deposited onto the surfaces 11, 13. For a front gap having a length of the order of 50 micro inches, it is preferred that each layer 14 and 16 have a uniform thickness of the order of 25 microinches. In the case of an I-core, such as member 10, it is preferred that the layer 14 extend past the region of the intended gap, but not into the region of the back gap, to be described. In the case of a C-core, such as member 12, it is preferred that the layer 16 extend over surface 13 and into the depression of the C, but not into the region of the back gap. The gap material of layers 14 and 16 is selected from a group of non-magnetic materials which do not appreciably attack, nor are attacked by, or reactive with, chemically or molecularly, the ferrite material of the members 10 and 12, nor the glass bonding material to be applied next. Further, it is preferred that the spacer material of layers 14 and 16 have similar thermal expansion characteristics as the ferrite, at least over the temperature range to which the structure will be subjected. Examples of suitable materials for layers 14 and 16 include zirconium oxide and magnesium aluminate.

Surfaces 15 and 17 of members 10 and 12, which will form the back gap of the magnetic head, are not coated by layers 14 and 16.

Next, the facing surfaces of members 10 and 12 and layers 14 and 16 (including surfaces 15 and 17 of the back gap) are coated with a thin, uniform layer of bonding glass 18, 20, the formulation of which is well-known in the art. Preferably, the glass layers 18 and 20 are sputter deposited onto layers 14 and 16 and the facing exposed surfaces of members 10 and 12. Typically, layers 18 and 20 are sputter deposited to a uniform thickness of the order of 25 microinches each. Thereafter, the coated members are aligned and held together in the position shown in FIG. 3.

As shown particularly in FIG. 3, when positioned in confronting relation, member 10 will be at a slight angle $\alpha$ to member 12, and glass layers 18 and 20 will abut each other along lines parallel to the width of the members generally indicated at reference numerals 24 and 26 (namely at the surface of the back gap and at the apex between the window and the front gap). The distance between lines 24 and 26 is equal to the heights of the back gap and the window ($h_1 + h_2$). The member 10 is at an angle dependent upon the thicknesses of layers 14 and 16 and the distance between lines 24 and 26. For the example given wherein the combined height ($h_1 + h_2$) of the back gap and window is of the order of 45–75 mils and the combined thicknesses of layers 14 and 16 is of the order of 50 microinches, angle $\alpha$ is of the order of 0.05° (having a sine/tangent of the order of 0.0006 to 0.001). Hence, the space 22 between the surfaces of layers 18 and 20 is a tapered space, tapering from zero at the apex (at line 26) to a maximum indicated by reference numeral 22 at the surface. (Since the sine/tangent of angle $\alpha$ is of the order of 0.001, it will be recognized that the size of the space between the glass layer increases about 1 microinch for each mil of distance from line 26. Hence, the ferrite members having an unfinished front gap height, $h_3$, of the order of 160 mils, the distance at reference numeral 22 will be 160 microinches.)

Figure 4:
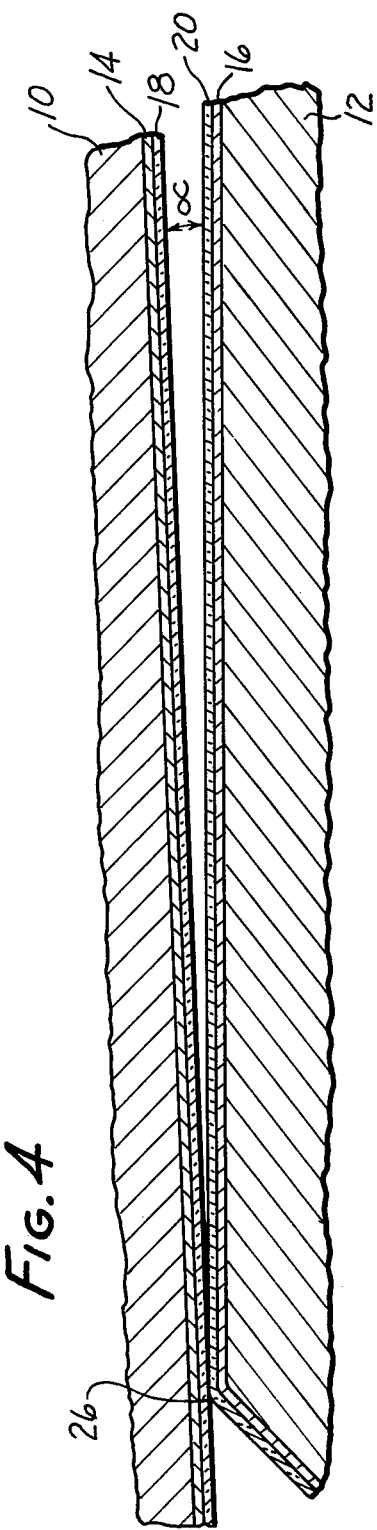
FIG. 4 is an enlarged section view of portion 4—4 in FIG. 3.

With reference to FIGS. 4 and 5, and with the members in confronting relation as shown in FIG. 3, heat is applied to the assemblage adequate to melt the glass layers 18 and 20 to at least their softening temperature. It is not necessary to heat the glass to such a high temperature that the glass will flow readily with a low viscosity. With the glass at a temperature, a force of about 2500 grams is imposed on the assemblage to fuse the glass layers together at both front and back gaps while at the same time squeezing glass from the regions of at least part of the unfinished front and back gaps. As the parts are squeezed together, glass between the parts are fused and squeezed. Some glass will flow toward the window region to form beads 28 and 30 at the front and back gaps, respectively. Some of the glass in the region of the front gap will flow toward the surface of the gap, as the tapered nature of the space between the glass layers 18 and 20 permits the glass to flow and the forces are sufficient to overcome any capillary forces of the glass in the space.

FIG. 5 is an enlarged section view showing a portion the gap height, $h_3$. As shown in FIG. 5, for the conditions herein stated, the glass will bond together over a distance of about 60 mils from line 26, thereby leaving a section of the gap unbonded. At that point, the tapered gap will consist of 50 microinches of spacer layers 14 and 16 and about 60 microinches of glass (there being about 1 microinch of glass thickness to the gap for each linear mil removed from line 26). Hence, at line 26 layers 14 and 16 are essentially contiguous, and bonding glass will bond the gap together over a distance of about 60 mils. Since the portion of the unit to the right of dashed line 32 will be cut away and discarded anyway, the failure to bond over the entire gap height is not consequential.

Although the present invention has been described in connection with the formation of a particular magnetic head having a particular gap length, the process is useful for other gap sizes. In this respect, it is expected that the sine/tangent of the angle and the thicknesses of layers 18 and 20 of bonding glass must be such as to insure that the glass will completely fuse in the front gap for a distance from line 26 at least or great as the finished gap height $h_4$, to be described. Further, the angle and thicknesses of bonding layers must also be such as to insure that the glass will completely fuse through the back gap height. Thus, in the example given for an angle having a sine/tangent of the order of about 0.001 and the combined thicknesses of glass layers 18 and 20 being of the order of 50 microinches, the glass will completely fuse through the 20 mil back gap height as well as for an adequate distance (namely, of the order of about 60 mils) in the unfinished front gap. Since most of the front gap material will be cut away and removed, leaving a finished front gap of the order of 0–2 mils, the conditions stated are considered quite adequate. It is expected that the angle should have a tangent in the range between about 0.0001 and 0.002 and the thicknesses of glass layers 18 and 20 (before fusion) should each be between 10 and 50 microinches for a back gap height of 20 mils. It is preferred that the sine/tangent be as small as practical, but not equal to zero (indicating a parallel condition).

Upon completion of the bonding and extruding process, the assemblage is cooled to room temperature and is cut at dashed line 32. That portion of the gap region to the right of line 32 in FIG. 5 is removed and may be discarded. Typically, line 32 is of the order of about 5 mils from line 26, and preferably is no more than 10 mils from line 26. Hence, the amount of glass in the gap length at the surface will be between 5 and 10 microinches. Subsequently, and as shown in FIG. 7, the completed core may be cut or diced at dashed lines 34 to form individual cores for magnetic heads. Thereafter, the individual cores are mounted on suitable pads (not shown) and the gap surface is cut or machined to a height, $h_4$, which is the finished gap height of the magnetic head. Typically, the finished gap height $h_4$ will be between 0 and 2 mils. Hence, the amount of glass in the gap length L at the surface will be between 0 and 2 microinches, or less than about 4% of the finished gap length.

A small amount of glass will also remain at the back gap, but the effect of any glass in the back gap is negligible.

The length of the gap formed by layers 14 and 16 is approximately equal to the combined thicknesses of layers 14 and 16. While it is preferred that each layer 14 and 16 be of equal thickness (and hence, one-half the length of the intended gap), this relationship is not necessary and the two layers may be unequal in thickness. By way of example, by sputter depositing layers 14 and 16 to a thickness of about 25 microinches, a gap of the order of about 50 microinches length will be formed. The temperature at which the process is accomplished is dependent upon the characteristics of the glass. It is necessary that the process be accomplished with molten glass, at least as high as the softening point of the glass, but not as such a high temperature that the glass will flow readily with a low viscosity. As a result, the process can be accomplished at temperatures lower than used in capillary processes for the same glass, thereby reducing degradation of the ferrite structure. Also, due to the lower temperatures involved in the process according to the present invention, a wider selection of bonding glass may be used.

This invention is not to be limited by the embodiment described in the description or shown in the drawings, which is given by way of example and not of limitation, but only in accordance with the scope of the appended claims.

What is claimed is:

1. A process for forming a gap for a magnetic head comprising the steps of: sputter depositing a layer of nonmagnetic spacer material onto portions of the confronting surfaces of each of at least two substantially rigid magnetic members; sputter depositing a layer of bonding material onto each layer of spacer material and onto the remaining exposed portions of the confronting surfaces of said magnetic members said spacer material not being appreciably reactive with either said bonding material or said magnetic members; positioning the magnetic members so that the layers of spacer material confront each other and said layers of bonding material are contiguous along a first line in the region of said confronting surfaces not including said layers of spacer material and along a second line in the region of said confronting surfaces between said layers of spacer material, said members being disposed at an angle whose sine/tangent is essentially equal to the thicknesses of said layers of spacer material divided by the distance between said first and second lines; pressing said members together while maintaining said bonding material at a predetermined temperature to fuse portions of said layers of bonding material together and to displace bonding material from portions of the regions between the confronting surfaces to bring the confronting surfaces of said magnetic members into contiguous relation at the region of said first line and to bring the layers of spacer material into contiguous relation in the region of said second line; cooling the members to ambient temperature; and removing most of the members and spacer material from the region of the confronting surfaces thereof to form a gap having a predetermined gap height, whereby the gap has a gap length essentially equal to the combined thicknesses of said layers of spacer material, said spacer material being a nonmagnetic material which is not appreciably reactive with the magnetic members.

2. The process according to claim 1 wherein the thicknesses of each of said layers of spacer material is of the order of about 25 microinches, and the sine/tangent of said angle is of the order of 0.001.

3. The process according to claim 2 wherein said gap height is of the order of 0–2 mils.

4. The process according to claim 2 wherein said bonding material is glass and said spacer material is not appreciably reactive with glass.

5. The process according to claim 4 wherein said members are ferrite cores and said spacer material is selected from the group consisting of zirconium oxide and magnesium aluminate.

6. The process according to claim 1 wherein said bonding material is glass and said spacer material is not appreciably reactive with glass.

7. The process according to claim 6 wherein said members are ferrite cores and said spacer material is selected from the group consisting of zirconium oxide and magnesium aluminate.

8. The process according to claim 1 wherein said members are ferrite cores and said spacer material is selected from the group consisting of zirconium oxide and magnesium aluminate.

9. A process of forming a gap for a magnetic head comprising the steps of: sputter depositing a first layer of spacer material onto the end surface of a first leg of a substantially rigid C-core ferrite member; sputter depositing a second layer of spacer material onto a portion of a surface of a substantially rigid I-core ferrite member; sputter depositing a first layer of bonding glass onto the first layer of spacer material and onto the end surface of the second leg of said C-core ferrite member; sputter depositing a second layer of bonging glass onto the second layer of spacer material and onto the remaining portion of the surface of said I-core ferrite member, each of said layers being of essentially uniform thickness; positioning said members so that said layers of spacer material are in confronting relation and said first and second layers of bonding glass are contiguous along a first line adjacent one edge of said second leg of said C-core ferrite member and along a second line adjacent tne apex between the window and first leg of said C-core ferrite member whereby an angle is formed between said members whose sine/tangent is essentially equal to the thickness of said first and second layers of spacer material divided by the distance between said first and second lines; pressing the members together while simultaneously heating the layers of bonding glass to at least its softening temperature to fuse portions of the layers of bonding glass together and to extrude bonding glass from portions of the regions between said members; cooling the members to ambient temperature; and removing most of the first leg of said C-core ferrite member and the confronting portion of said I-core member to form a gap having a predetermined gap height, whereby said gap has a gap length determined by the thickness of said first and second layers of spacer material plus the gap height times the sine/tangent of said angle, said spacer material being a nonmagnetic material which is not appreciably reactive with ferrite or with glass and which has thermal expansion characteristics substantially similar to that of ferrite over the temperature range between said ambient temperature and the softening temperature of said glass.

10. The process according to claim 9 wherein the thicknesses of each of said layers of spacer material is of the order of about 25 microinches, and the sine/tangent of said angle is of the order of 0.001.

11. The process according to claim 10 wherein said gap height is of the order of 0–2 mils.

12. The process according to claim 10 wherein said spacer material is selected from the group consisting of zirconium oxide and magnesium aluminate.

13. The process according to claim 9, wherein said spacer material is selected from the group consisting of zirconium oxide and magnesium aluminate.

* * * * *